United States Patent [19]

Watson et al.

[11] Patent Number: 5,021,942
[45] Date of Patent: Jun. 4, 1991

[54] DATA PROCESSING SYSTEM WITH PACKETS SPECIFYING FUNCTIONS AND ARGUMENTS

[75] Inventors: Paul Watson, Haywood; John V. Woods, Handforth, both of Great Britain; Ian Watson, Stockport, Great Britain

[73] Assignee: International Computers Limited, London, England

[21] Appl. No.: 210,497

[22] Filed: Jun. 23, 1988

[30] Foreign Application Priority Data

Jul. 30, 1987 [GB] United Kingdom ............ 8718056

[51] Int. Cl.$^5$ .............. G06F 9/302; G06F 9/305; G06F 9/32
[52] U.S. Cl. .................. 364/200; 364/244; 364/244.6; 364/252.3; 364/252.6; 364/255.2; 364/255.3; 364/258; 364/259
[58] Field of Search ... 364/200 MS File, 900 MS File

[56] References Cited

U.S. PATENT DOCUMENTS 4,156,798  5/1979  Doelz .................. 364/200
4,502,118  2/1985  Hagenmaier, Jr. et al. ...... 364/200
4,614,841  9/1986  Babecki et al. .............. 379/269
4,777,595  10/1988  Strecker et al. .............. 364/200

Primary Examiner—David Y. Eng
Assistant Examiner—Emily Y. Chan
Attorney, Agent, or Firm—Lee, Mann, Smith, McWilliams & Sweeney

[57] ABSTRACT

A data processing system is described in which the workload is divided into packets. A plurality of processors access the packets and process them by rewriting them according to predetermined rules. Packets can be of a number of different types, including XAPP and PAPP. An XAPP packet contains a function and one or more arguments in evaluated form, so that the function can be immediately applied to the arguements. A PAPP packet is similar except that its arguments may not be in evaluated form. Processing of an active PAPP packet consists of activating other packets which evaluate the arguments of the PAPP packet, and converting the PAPP to a suspended XAPP packet, awaiting return information from those other packets. The use of different packet types allows greater efficiency, by eliminating redundant actions in processing of the packets.

3 Claims, 6 Drawing Sheets

DATA PROCESSING SYSTEM WITH PACKETS SPECIFYING FUNCTIONS AND ARGUMENTS

BACKGROUND TO THE INVENTION

This invention relates to data processing systems.

More specifically, the invention is concerned with a data processing system of the kind in which the workload of the system is divided into packets, each packet specifying a function and one or more arguments to which the function is to be applied. One system of this kind is described, for example, in "ALICE—A Multiprocessor reduction Machine for the Parallel evaluation of applicative languages" by J. Darlington and M. Reeve, Proceedings of the ACM Conference on Functional Programming Languages and Computer Architecture, 1981.

In known systems of this kind, the packets are generally all processed by the same processing algorithm. For example, the processing algorithm may first inspect the arguments of the packet to determine whether all the arguments necessary for performing the function have been evaluated. If they have, the specified function is executed; if not, then one or more further packets are activated, so as to evaluate the required arguments.

A disadvantage of this, however, is that it can result in redundant actions being performed, and hence can lead to inefficiency. One object of the present invention is to provide a way of avoiding or at least reducing this inefficiency.

SUMMARY OF THE INVENTION

According to the invention, there is provided a data processing system comprising a packet memory holding a plurality of packets and at least one processor for processing the packets, wherein each packet includes a type field indicating one of a plurality of packet types including an executable packet type and a processable packet type, each executable or processable packet including a function and one or more arguments to which the function is to be applied, and wherein an active executable packet is processed by applying the function to the arguments, whereas an active processable packet is processed by converting it to a suspended executable packet and activating one or more other packets which evaluate the arguments for this packet.

It can be shown that, by providing different packet types, each of which is processed by a different algorithm, it is possible to optimise the operation performed by each packet, so as to reduce the redundant operations.

One data processing system in accordance with the invention will now be described by way of example with reference to the accompanying drawings.

DESCRIPTION OF AN EMBODIMENT OF THE INVENTION

Figure 1:
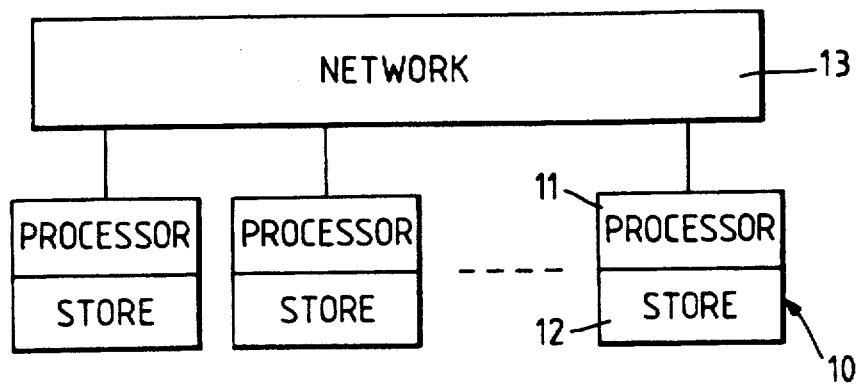
FIG. 1 is an overall view of a data processing system, comprising a number of processing nodes.

Referring to FIG. 1, the data processing system comprises a plurality of processing nodes 10.

Each node comprises a processor 11 and a local store 12.

The workload of the system is divided into units referred to as packets, which will be described in detail below. A packet can reside in any of the local stores 12. Conceptually, all the local stores form a single packet memory for the system, and each packet has a 32-bit address indicating its location within this packet memory. Bits 31-24 of this address indicate which of the individual local stores the packet is resident in, while bits 23-0 indicate the address of the packet within that store.

Each processor 11 accesses active packets held in its own local store 12 and processes them according to the type of packet, as will be described. The processing nodes operate simultaneously, in parallel, resulting in a high overall rate of processing, proportional to the number of processing nodes in the system.

The processing nodes are interconnected by an interprocessor network 13, which allows any processor to send a message to any other one of the processors. The network 13 may, for example, be a known delta network.

If required, a processing node can read a packet from its own local store and export it over the network 13 to another node, so that it will now reside in the local store of that other node. For example, when a processing node detects that it is becoming overloaded, it may export packets to other nodes so as to even out the workload between the nodes. Packets may also be exported from one node to another in order to activate another packet in the remote node, or to return results to a packet in the remote node.

Figure 2:
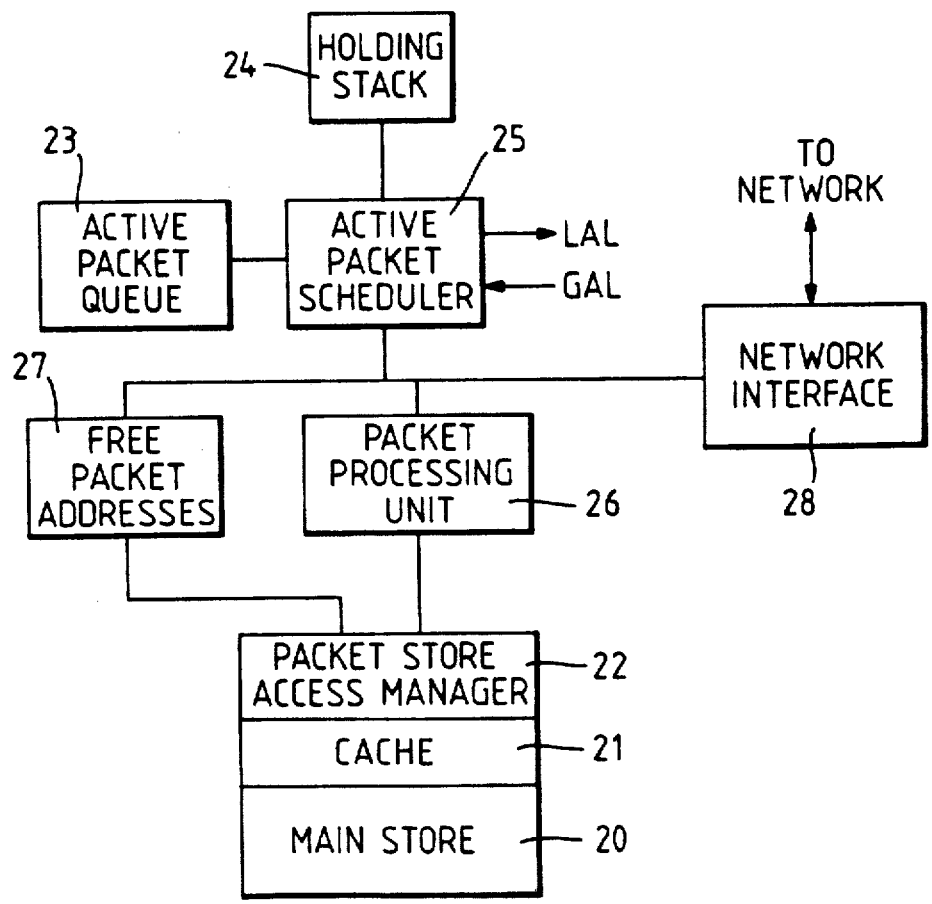
FIG. 2 is a block diagram showing one of the nodes, including an executable packet scheduler and a packet processing unit.

Referring now to FIG. 2, this shows one of the processing nodes in greater detail.

The local store 12 within the node comprises a main store 20, a cache store 21, and a store access manager 22. The main store is a random access memory which holds all the packets resident in this node. The cache store is a smaller, faster, associatively addressed memory, which holds copies of data from the main store currently in use. The store access manager controls access to the cache and main store, and controls the copying of data from the main store into the cache.

The node also includes an active packet queue (APQ) 23. This is a first-in-first-out memory, and is used to hold the addresses of all active packets in the local store 12, i.e. packets which are waiting to be processed in this node. Overflow from the APQ is held in a holding stack (HS) 24, which is organised as a last-in first-out memory. The APQ and HS are controlled by an active packet scheduler (APS) 25 as will be described.

The APS passes packet addresses to a packet processing unit (PPU) 26, which accesses the packets from the local store 12 and processes them. This processing generally involves re-writing the packet and changing its type and state. The processing may also involve re-writing or changing the state of other packets, the creation of new packets, or the deletion of existing packets.

The processing node also includes a free packet address store (FPA) 27, which holds addresses of free packet locations in the local store 12. Whenever the PPU deletes a packet, it returns the address of the packet to the FPA. Conversely, when a new packet is created, a free packet address is removed from the FPA and the new packet is placed in this location.

The APS and PPU interface with the interprocessor network by way of a network interface (NIF) 28.

In operation, the APS in each node generates a local activity level signal (LAL) indicating the current workload of this node, i.e. the number of active packets waiting to be executed. This signal is applied to the network 13 by way of the NIF. The network receives these signals from all the nodes, and generates a global activity level signal (GAL), which is returned to all the nodes.

Figure 3:
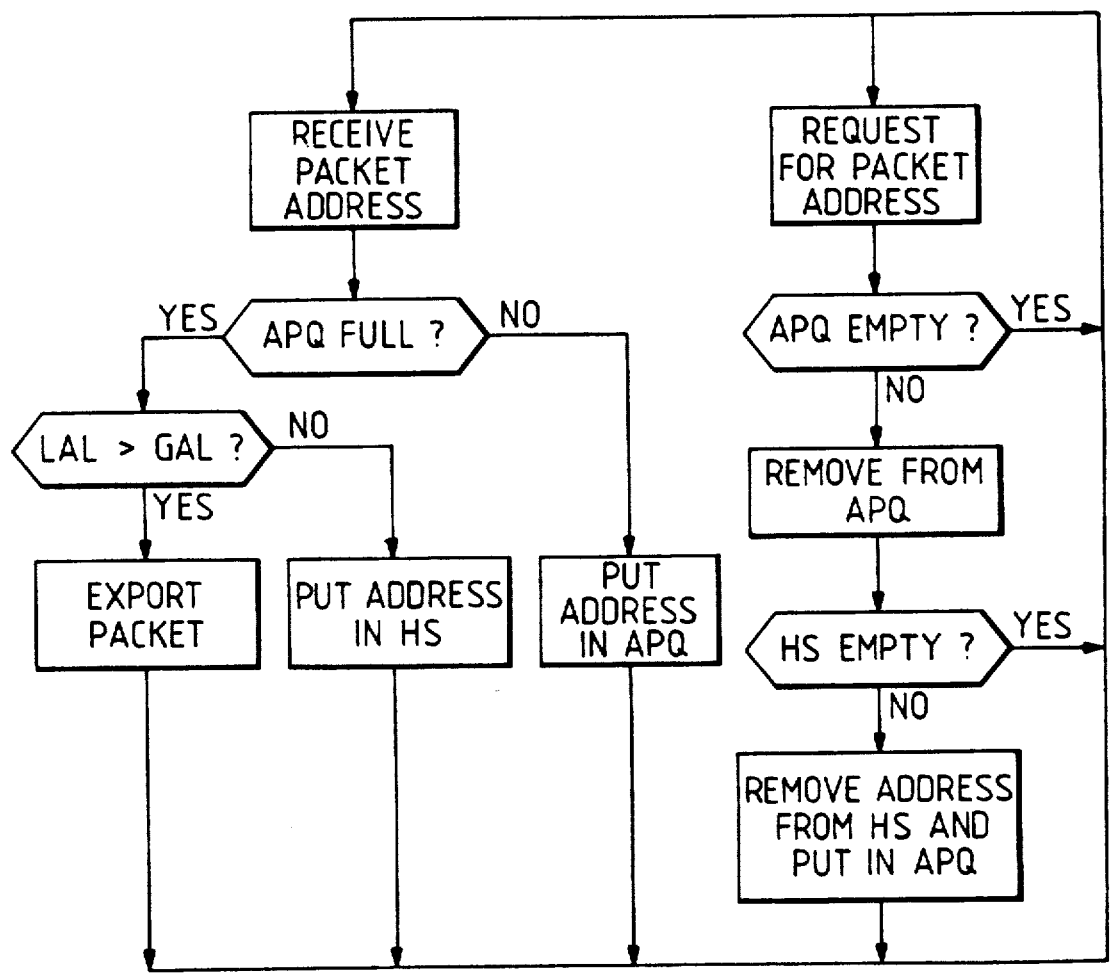
FIG. 3 is a flow chart showing the operation of the executable packet scheduler.

Referring now to FIG. 3, this shows the operational algorithm of the active packet scheduler APS. This algorithm may be implemented either in hardware, microcode, software, or a mixture of these. The exact nature of the implementation forms no part of the present invention and so will not be described in detail.

Whenever the APS receives (301) a packet address, either from the associated PPU in the same node, or from another node via the NIF, it first checks (302) whether the active packet queue APQ is full. If not, then the packet address is placed (303) in the APQ. If, on the other hand, the APQ is full, the APS checks (304) whether the local activity level LAL of this node is greater than the global activity level GAL. If so, the packet is read out of the local memory and exported (305) over the network to one of the other nodes that has a lower activity level.

If the local activity level LAL is less than the global level GAL, then the packet is not exported. Instead, its address is placed (306) in the holding stack HS.

Whenever the APS receives (307) a request for a packet from the associated PPU in the same node, it first checks (308) whether the APQ is empty. If it is not empty, it removes (309) a packet address from the APQ and returns it to the PPU. The APS then checks (310) whether the HS is empty. If it is not empty, the APS removes (311) the last address held in the HS and puts it into the APQ.

The packet format will now be described. Each packet consists of a header, followed by one or more packet items.

The header includes the following fields: type, state, size, susp, strict and ref-count.

The type field indicates the packet type. Possible packet types include the following:
XAPP executable apply
PAPP processable apply
UCON unevaluated constructor
ECON evaluated constructor
CODE code
RETN return The state field indicates the state of the packet, as follows:
ACT active
DOR dormant
SUS suspended
REL relay The size field indicates the number of items in the packet.

The susp field indicates the number of items that a packet in the SUS or REL states is waiting to be evaluated before that packet can be activated.

The strict field indicates the number of strict arguments in the packet. A strict argument of a function is one which must be in evaluated form before the function can be executed.

The ref-count field indicates the number of other packets that refer to the packet. It is used for garbage collection: any packet that has a ref-count equal to zero can be deleted and its address returned to the FPA.

The normal format for a packet item consists of the fields type, subtype, qualifier, and value.

A packet item of type 1, subtype 0 is a built-in function code, representing one of a set of built-in functions, specified by the value field as follows:

| Value | function |
|---|---|
| 0 | add |
| 1 | subtract |
| 2 | multiply |
| 3 | divide |
| 4 | output |
| 5 | halt |

For an item of type 1, subtypes 1–5, the value field represents a literal value according to the sub type, as follows:

| Subtype | value |
|---|---|
| 1 | integer |
| 2 | unsigned |
| 3 | boolean |
| 4 | character |
| 5 | real |

For an item of type 2, the value field represents a return address RTN which is used, as will be described, as a pointer from the packet to a parent packet in a graph structure.

For an item of type 3, the value field represents a pointer PTR which points to an offspring packet in a graph structure. The subtype field of this packet indicates whether the offspring packet has been evaluated.

In the case of a CODE packet, the packet items do not have the normal item format described above. Instead, the items represent a sequence of microcode, for executing a user-defined function.

Figure 4:
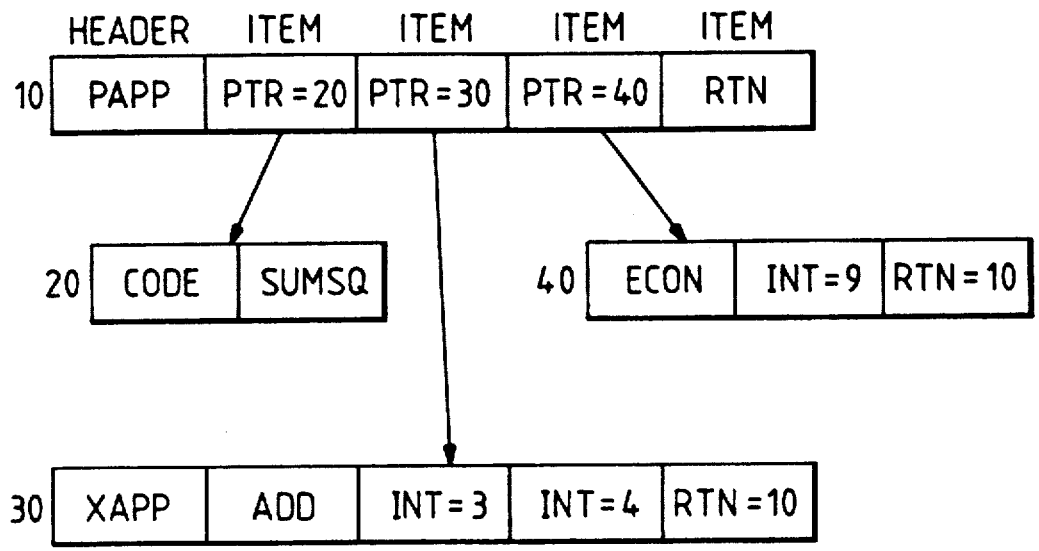
FIG. 4 shows the formats of packets.

Referring to FIG. 4, this illustrates some possible packet layouts, and the way in which the packets can be organised in a graph structure by means of the pointers and return addresses.

A executable apply packet XAPP comprises a header, followed by an item representing a function to be performed, followed by one or more items representing the arguments of that function (with the strict arguments first, followed by the non-strict arguments, if any), and finally an item representing a return address. The item representing the function may either be a built-in function, or a pointer to a CODE packet representing a user-defined function.

For example, in FIG. 4, the packet 430 at address 30 is an XAPP packet having four items. The first item is a built-in function ADD. The next two items are literal integer values 3 and 4. The final item is a return address 10 indicating that the result of evaluating this packet is to be returned to the packet at address 10. It should be noted that both the arguments for the XAPP packet are in evaluated form, so that the packet can be evaluated as soon as it is activated.

A processable apply packet PAPP has a similar layout to an XAPP packet, the difference being in the way in which the packet is processed, as will be described. A PAPP packet is used where one or more of the arguments of the packet have not yet been evaluated.

For example, in FIG. 4, the packet 410 at address 10 is a PAPP packet having four items. The first item is a pointer which points to a CODE packet 420 at address 20, containing microcode for executing a user-defined function. For example, the microcode may be a function SUMSQ which forms the sum of the squares of two arguments. The second and third items in the PAPP packet represent the arguments for this function. The first of these is a pointer to the XAPP packet at address 30. At this stage, this argument is unevaluated; it will be overwritten with the evaluated value (7) when the XAPP is processed. The second argument item is a pointer to an ECON packet 440 at address 40, representing an integer data value 9 in this case. The final item of the PAPP packet is a return address which points back to a parent packet—is assumed that the graph shown in FIG. 4 represents only part of some larger graph.

An evaluated constructor packet ECON comprises a header, followed by one or more items, each of which may be a literal value, or a pointer to another ECON packet, and finally an item representing a return address.

ECON packets can be used to represent data structures such as lists or arrays. In the example shown in FIG. 4, the ECON packet at address 40 represents the simplest possible data structure i.e. a single data item (the integer value 9). More complex data structures can be built up by means of pointers within the ECON packets.

An unevaluated constructor packet UCON is similar to an ECON packet, except that it contains a pointer which points, directly or indirectly via other UCON packets, to another packet (e.g. an XAPP packet) which has not yet been evaluated.

The purpose of INDI and RETN packets will be described later.

Figure 5:
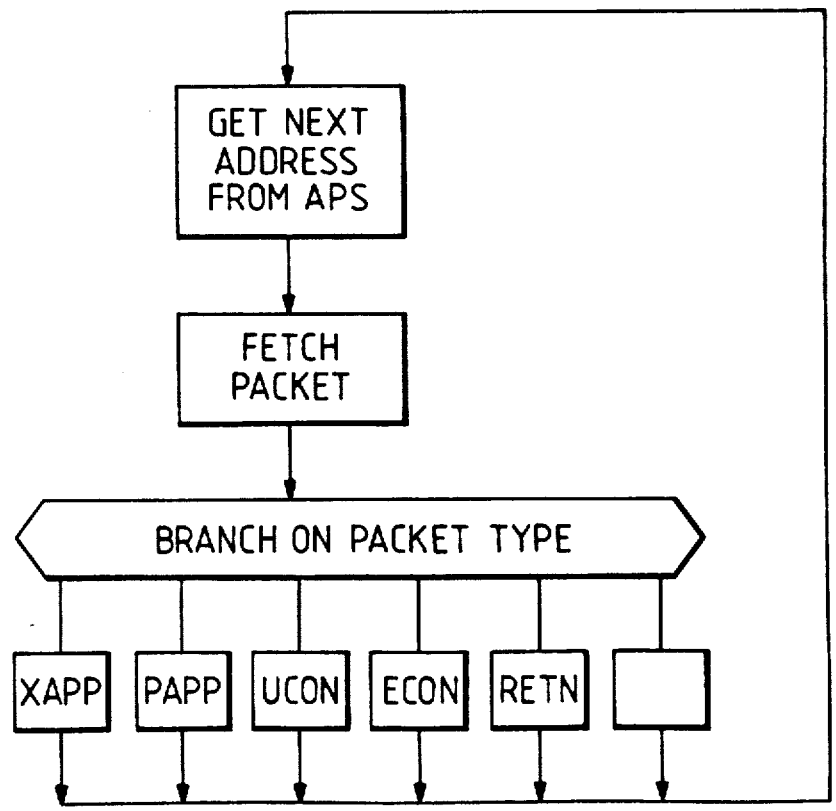
FIG. 5 is a flow chart showing the operation of the packet processing unit.

Referring now to FIG. 5, this shows the operational algorithms for the packet processing unit (PPU) 26. These algorithms may be implemented either in hardware, microcode, software or a mixture of these. The exact nature of the implementation forms no part of the present invention and so will not be described in detail.

Whenever the PPU becomes idle, it requests (501) the active packet scheduler APS to send it another packet address from the APQ. If the APQ is empty, the PPU remains idle.

When the PPU receives a packet address from the APS, it uses this address to access (502) the packet from the local store. The PPU examines the packet type field in the header of the packet, and branches (503) to one of a number of algorithms (504) according to the packet type.

Figure 6:
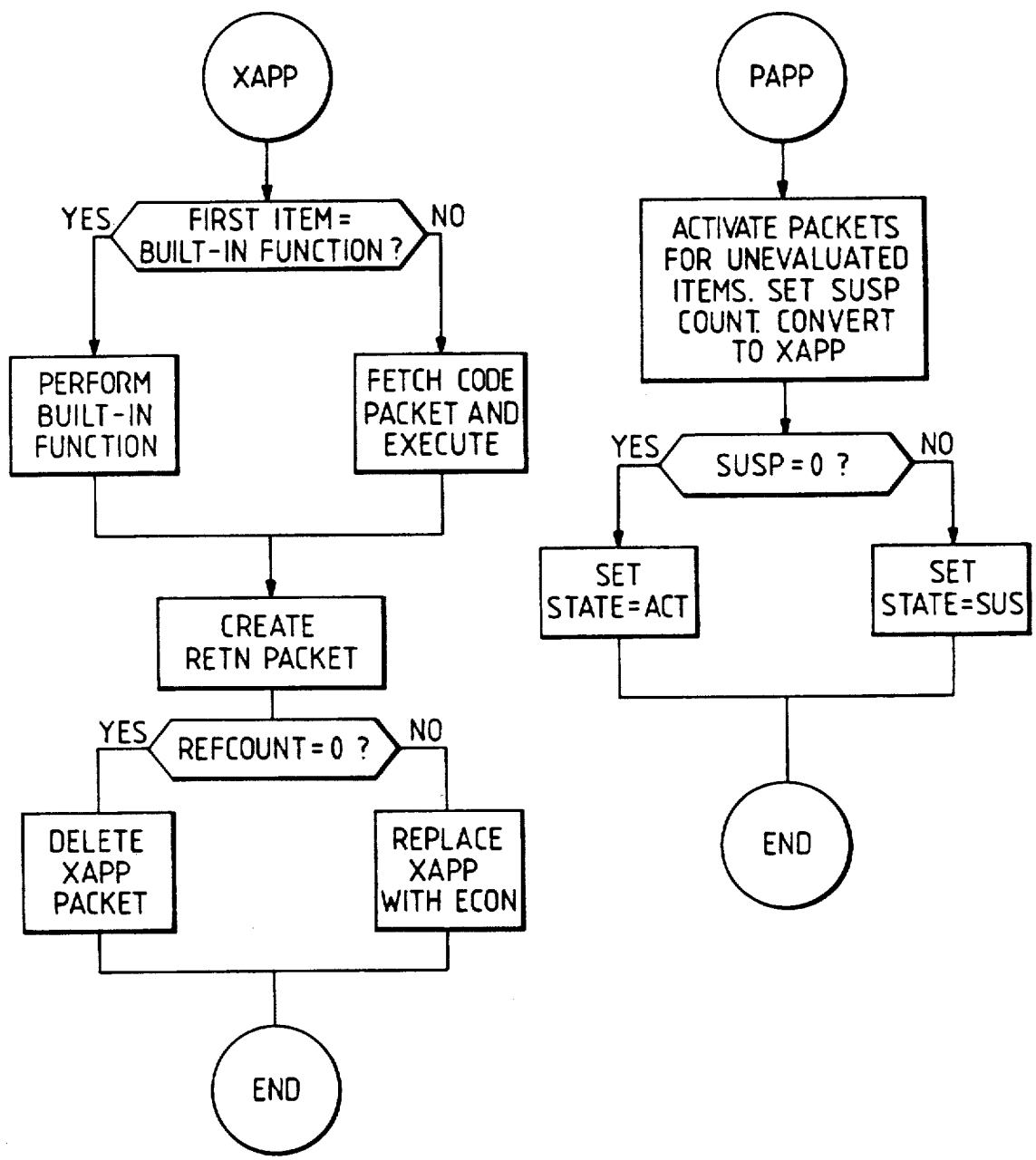
FIGS. 6, 7 and 8 are flow charts showing parts of the flow chart of FIG. 5 in greater detail.
Figure 7:
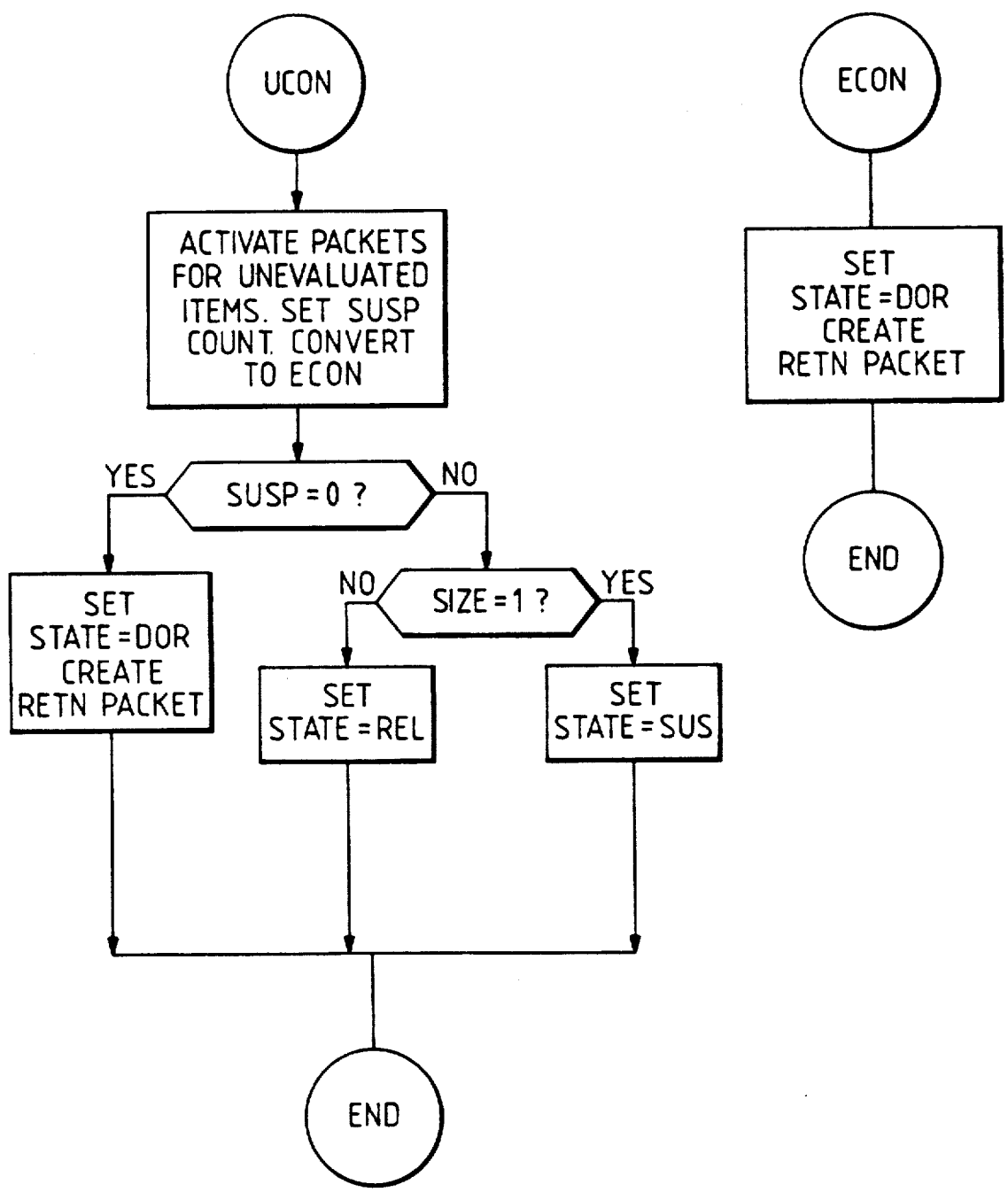
Figure 8:
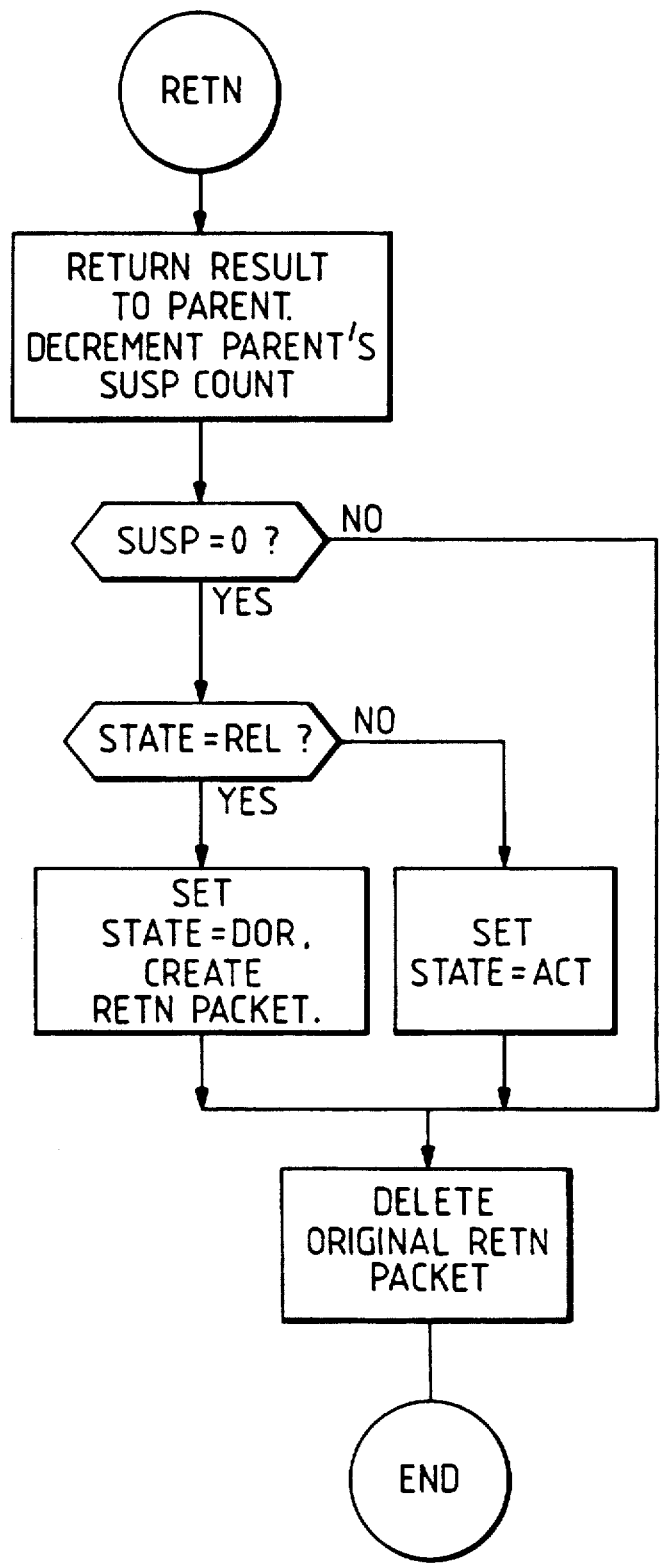

FIGS. 6, 7 and 8 show these algorithms in detail.

XAPP

In the case of an executable apply packet XAPP, the first item of the packet is either a built-in function, or a pointer to a CODE packet representing a user-defined function (601). In the former case, the built-in function is executed (602). In the latter case, the CODE packet is accessed, and the microcode is executed (603) to perform the user-defined function.

A RETN packet may then be created (604), with its state set to ACT (active). This packet contains two items: a first item representing the result of evaluating the XAPP packet, and a second item representing a return address, equal to the return address of the XAPP packet.

When this RETN packet is processed, it will return the result of the evaluation to the parent of the XAPP packet. If this parent packet is resident in a different processing node, then the RETN packet is exported to that node.

The ref-count field of the XAPP packet is then accessed (605). If this ref-count is non-zero, the XAPP packet is replaced (606) by an ECON packet, holding the evaluated result. Otherwise, if the ref-count is zero, the XAPP packet is deleted (607) and its address is added to the free address store (FPA) 27.

PAPP

In the case of a processable apply packet PAPP, the packet pointed to by each unevaluated pointer item representing a strict argument is activated (610). The susp field in the PAPP packet is set equal to the number of packets that are activated in this way. The PAPP packet is then converted to an XAPP packet. The susp field is then examined (611), and if it is equal to zero, the state of the packet is set to ACT (612); otherwise the state is set to SUS (613).

If a packet which is required to be activated resides in a different node, then the activation cannot be performed directly. Instead, a message is sent to the remote node, requesting it to activate the packet.

UCON

In the case of an unevaluated constructor packet UCON, the packet pointed to by each unevaluated pointer item representing a strict argument is activated (701). The susp field in the UCON packet is set equal to the number of packets activated in this way. The UCON packet is then converted into an ECON packet.

The susp field is now examined (702). If the susp field is equal to zero, the packet is put into the DOR state, and a RETN packet is created (703) as described above. If, on the other hand, the susp field is not equal to zero (i.e. it is greater than zero), then the size field of the packet header is now examined (704).

If the size field is equal to one, indicating that the packet represents a single data item, then the packet is put into the SUS state (705). If the size field is not equal to one (i.e. is greater than one), indicating that the packet represents a multi-item data structure, then the packet is put into the REL state (706).

ECON

In the case of an evaluated constructor packet ECON, the state of the packet is set to DOR, and a RETN packet is created (710) as described above.

RETN

In the case of a return packet RETN, the first action (801) is to write the return value held in the packet into the parent packet, i.e. the packet pointed to by the return address in the RETN packet. The susp field of the parent packet is decremented by one. If this susp field is now zero (802), and the parent packet is in the REL state (803), then the parent packet is put into the DOR state (804), and at the same time a further RETN packet is created, returning the address of the parent packet to hat packet's parent. If the susp field is zero, and the parent packet is in the SUS state, then the parent packet is put into the ACT state (805). Finally, the original RETN packet is deleted (806) and its address is returned to the free packet address store.

EXAMPLE OF OPERATION

An example of the operation of the packet processing unit will now be given. It is assumed that initially a node contains the packets shown in FIG. 4. Using a different notation, these packets may be represented as follows:

10:ACT, PAPP; PTR=20; PTR=30; PTR=40; RTN
20:CODE; sumsquares
30:DOR, XAPP; ADD; INT=3; INT=4; RTN=10
40:DOR, ECON; INT=9; RET=10

Initially, only the PAPP packet at address 10 is active (ACT), the other packets being dormant (DOR), except for the code packet which does not have any packet state.

When the PAPP packet is processed, it is converted to a suspended XAPP packet. The packets pointed to by the two unevaluated pointer items PTR=30, PTR=40 are then activated; that is, the packets at addresses 30 and 40 are both are both put into the ACT state. The susp field of the first packet is set to 2, indicating that two packets have been activated and hence two return items are expected.

The packets are now as follows:
10:SUS, XAPP, susp=2; PTR=20 - - -
20:CODE - - -
30:ACT, XAPP; ADD; INT=3; INT=4; RTN=10
40:ACT, ECON; INT=9; RTN=10

When the XAPP packet at address 30 is processed, the built-in ADD function is applied to the integer arguments 3 and 4 to produce the result 7. A RETN packet is then created (at address 35, say) holding this result, and having a return address equal to that of the XAPP packet. The XAPP packet is then deleted.

Similarly, when the ECON packet at address 40 is processed, a RETN packet is created (at address 45, say) holding the integer value 6 from the ECON packet. The ECON packet is put back into the DOR state.

The packets are now as follows:
10:SUS, XAPP, susp=2; PTR=20 - - -
20:CODE - - -
35:ACT, RETN; INT=7; RTN=10
40:DOR, ECON - - -
45:ACT, RETN; INT=9; RTN=10

The two active RETN packets can now be processed. Each of these packets causes the XAPP packet at address 10 to be re-written, by replacing the pointer item with the integer return value held in the RETN packet. Each time, the susp field of the XAPP packet is decremented by one. When the susp field reaches zero, the XAPP packet is activated. Both the RETN packets are deleted when they are processed.

The packets are now as follows.
10:ACT, XAPP; PTR=20; INT=7; INT=9; RTN
20:CODE; sumsquares
40:DOR, ECON; INT=9; RTN=10

The XAPP packet is now processed, by applying the user-defined function in the CODE packet to its two arguments 7 and 9 to produce the result $7^2+9^2=130$. This result is placed in another RETN packet, so as to return it to the packet (not shown) to which the return address of the XAPP packet points.

In conclusion, it can be seen that by having two different packet types XAPP and PAPP which are processed by different algorithms, the efficiency of execution can be improved.

The decision as to whether to make a given packet an XAPP or a PAPP is made at compile time, when the packets are initially created and placed in the packet memory.

We claim:
1. A data processing system comprising:
   a) a packet memory holding a plurality of packets, each of said packets comprising:
      (i) a function field representing a function,
      (ii) a number of argument fields, each argument field representing an argument value, or a pointer to another packet,
      (iii) a type field indicating one of a plurality of packet types, including a first packet type which denotes that all the arguments of the packet represent argument values, and a second packet type which denotes that at least one of the arguments of the packet represents a pointer to another packet, and
      (iv) a state field, indicating one of a plurality of packet states including an active state and a suspended state,
   b) first processing means, connected to the packet memory, for processing an active packet of the first packet type from the packet memory, by applying the function represented by the function field of the packet to the argument values represented by the argument fields of the packet, to thereby calculate a result for the packet,
   c) second processing means, connected to the packet memory, for processing an active packet of the second packet type from the packet memory by converting it to a suspended packet of the first packet type, and
   d) third processing means coupled to the second processing means, for activating each packet pointed to by the argument fields of the packet being processed by the second processing means.

2. A system according to claim 1 further including fourth processing means, connected to the packet memory, for processing an active packet pointed to by an argument field of another packet, to produce a result value, and means, coupled to the fourth processing means, for substituting said result value as an argument value into said argument field of said other packet.

3. A system according to claim 2 further including means, connected to the packet memory, for activating a suspended packet of the first packet type when all its argument fields have had argument values substituted into them.

* * * * *